2,970,045

CATALYZED OXYGEN-PRODUCING COMPOSITIONS

Martin Leatherman, Bel Air, Harford County, Md.

No Drawing. Filed July 18, 1958, Ser. No. 749,339

2 Claims. (Cl. 44—3)

(Granted under Title 35, U.S. Code (1952), sec. 266)

This application is made under the act of March 3, 1883, as amended by the act of April 30, 1928, and the invention herein described, if patented, may be manufactured and used by or for the Government for governmental purposes without the payment to me of any royalty thereon.

This invention relates to compositions comprising ammonium perchlorate and certain substances which act to facilitate the thermal decomposition of the said ammonium perchlorate at a temperature much below that at which the ammonium perchlorate would normally decompose in the absence of my added substances. I am not certain that the effect which I attain is truly catalytic in nature and I do not rest my invention upon the nature of the action but only upon the end result. For purposes of conciseness I refer to my added substances as catalysts even though I do not recover these said substances in their original form after the decomposition of the ammonium perchlorate has occurred. My catalysts bring about the rapid non-explosive decomposition of ammonium perchlorate with accompanying release of oxygen in such a way as to enhance the oxidizing power of the said ammonium perchlorate.

My objective may be attained through simple mechanical mixing of my said catalysts with ammonium perchlorate, both preferably in finely divided form, but I do not restrict myself in this respect. There are obvious alternatives to such mechanical mixing, such as mutual grinding or pulverizing, mixing of the solid finely divided catalysts with solutions of ammonium perchlorate to form a slurry which can be dried in any desired way, such as spray drying.

As catalysts, I successfully use zinc oxide or any other zinc-constituents which will be converted to zinc chloride upon contact with or action of hydrogen chloride. Thus, I may even use zinc metal dust as well as zinc hydroxide, zinc carbonate, or basic zinc carbonate. Some of these zinc-containing substances are disclosed in earlier patents, issued to me, as catalysts for dechlorination of chlorinated compounds employed as flameproofing additives. However, in the prior art, they were used to bring about the splitting of hydrogen chloride from chlorinated paraffin. In the present invention, the effect I bring about is quite different, since my catalysts appear to decrease formation of hydrogen chloride which is a normal thermal decomposition product of ammonium perchlorate.

When ammonium perchlorate is heated by itself, little effect is apparent at any temperature below 400° C. except a gradually increasing sublimation and slight decomposition. At about 400° C., ammonium perchlorate decomposes by deflagration. It is well known that this substance is dimorphous and that it undergoes an endothermic change from a less stable to a more stable crystalline form at about 240° C. The great value of my discovery lies in the fact that the catalysts which I employ bring about the sudden but non-explosive decomposition of the said ammonium perchlorate in approximate coincidence with this change to the more stable allomorphic form.

The proportion of catalyst which I employ may vary widely. Even a trace will exert an effect, and I have found no upper limit of proportion of catalyst. However, for most purposes, I will use approximately two parts of zinc oxide or other zinc-containing substance to one hundred parts of ammonium perchlorate.

Since the catalysts which I have found to be effective appear to exert their effect because of the presence of chlorine which is in a more or less loosely combined state, they are not operative in the case of the chlorates or perchlorates of the fixed alkalis such as, for example potassium chlorate or perchlorate. The fixed alkali metals are, of course, non-volatile and they hold chlorine in strong combination. Ammonium perchlorate, on the other hand, breaks up completely into gaseous components as soon as the chlorine atom is split from the molecule.

At the deflagration temperature of 400° C., the chlorine atom normally escapes as free chlorine. Since the same is largely true when my catalysts bring about the decomposition of ammonium perchlorate at about 240° C., my catalysts in effect bring about a decomposition similar to that of deflagration at a temperature about 160° C. lower than that at which deflagration normally occurs.

It is well known that ammonium perchlorate produces relatively little heat upon decomposition. It is desirable in certain applications to generate greater heat and this can be done by incorporating with my catalyzed ammonium perchlorate certain substances commonly referred to as fuels, which often are merely organic substances of high carbon content. Such substances have a high heat of combustion, and the heat generated when they are burned by combining with the oxygen released from the ammonium perchlorate serves to heat intensely the gases formed by decomposition of the ammonium perchlorate. In this way, great kinetic energy can be imparted to these gases and this energy can be utilized to produce any effect from a powerful explosive action to a steady propulsive force of considerable duration. The physical effect of the gases liberated by my catalyzed ammonium perchlorate will be greatest when maximum heating of the liberated gases is produced. Certain substances or fuels are especially effective in producing such heating. These include substances composed of elements possessing low atomic weight. Examples of such substances are aluminum powder, carbon black, carbonaceous compounds, boron and boron compounds and so on. These substances may be mechanically mixed with my catalyzed ammonium perchlorate in powder form or may be formed into plastic or solid condition by use of suitable binders, such as rosin, for example.

My invention is of value in any application where the oxidizing power of ammonium perchlorate is useful. In many applications, the low temperature at which the oxygen is released is a valuable property. For example, I may employ the catalyzed ammonium perchlorate to advantage by itself in clearing heating plants and chimneys of soot deposits, in which case the soot acts as a heat producing fuel. It merely suffices to throw a small quantity of the catalyzed ammonium perchlorate, preferably in granulated form, into the clogged passage ways while the heating plant is in operation. Another application in which my catalyzed ammonium perchlorate-fuel combination is useful is in quickly kindling fireplace fires. There are other obvious uses for ammonium perchlorate which releases its oxyen and other gaseous decomposition products with greater readiness. An example is the preparation of fireworks or pyrotechnic compositions.

Having fully disclosed my invention, I claim:

1. A composition consisting essentially of ammonium perchlorate intimately admixed with a substance capable of thermally decomposing ammonium perchlorate near the allomorphic transition point of 240° C., said substance being selected from zinc-containing materials capable of undergoing reaction with hydrogen chloride to form zinc chloride.

2. A composition consisting essentially of ammonium perchlorate and a zinc-containing substance convertible into zinc chloride by reaction with hydrogen chloride intimately mixed with said perchlorate, said substance selected from the group consisting of zinc metal, zinc oxide, zinc hydroxide, zinc carbonate and basic zinc carbonate.

References Cited in the file of this patent

UNITED STATES PATENTS 1,276,537   Johnson _____ Aug. 20, 1918

FOREIGN PATENTS 2,172    Great Britain _____ of 1915
14,866   Great Britain _____ of 1915

OTHER REFERENCES

"Incendiary Fuels for Various Purposes," Cawley et al., page 95, August 1946.

"The Condensed Chemical Dictionary," 5th Ed., Reinhold Pub. Co., 1956, page 74.